United States Patent [19]

Yamazaki et al.

[11] 4,118,374

[45] Oct. 3, 1978

[54] PRODUCTION OF AROMATIC POLYAMIDES FROM DICARBOXYLIC ACID AND DIAMINE

[75] Inventors: Noboru Yamazaki; Fukuji Higashi, both of Tokyo, Japan

[73] Assignee: Sumitomo Chemical Company, Limited, Osaka, Japan

[21] Appl. No.: 801,243

[22] Filed: May 27, 1977

Related U.S. Application Data

[62] Division of Ser. No. 609,740, Sep. 2, 1975, Pat. No. 4,045,417.

[30] Foreign Application Priority Data

Sep. 9, 1974 [JP] Japan .................................. 49-104247

[51] Int. Cl.$^2$ ............................................. C08G 69/28
[52] U.S. Cl. ..................................... 528/337; 528/335; 528/346; 528/347; 528/348
[58] Field of Search ........................ 260/78 R, 47 CZ

[56] References Cited

U.S. PATENT DOCUMENTS

| 3,094,511 | 6/1963 | Hill et al. ............................ 260/78 R |
| 3,203,933 | 8/1965 | Huffman et al. ................... 260/78 A |
| 3,240,758 | 3/1966 | Smith et al. ........................ 260/78 A |
| 3,240,760 | 3/1966 | Preston et al. ..................... 260/78 R |
| 3,467,623 | 9/1969 | Hinderer et al. .................. 260/78 R |
| 3,558,571 | 1/1971 | Blume ................................. 260/78 A |
| 3,575,933 | 4/1971 | Hoegger et al. ................... 260/78 R |
| 3,640,970 | 2/1972 | Ozawa et al. ...................... 260/78 R |
| 3,652,510 | 3/1972 | Blomberg ........................... 260/78 A |
| 3,753,957 | 8/1973 | Jones ................................... 260/78 R |
| 3,932,364 | 1/1976 | Yamazaki et al. ................. 260/78 A |
| 4,045,417 | 8/1977 | Yamazaki et al. ................. 260/78 A |

FOREIGN PATENT DOCUMENTS

| 426,262 | 6/1967 | Switzerland. |
| 901,159 | 7/1962 | United Kingdom. |
| 1,028,157 | 5/1966 | United Kingdom. |

*Primary Examiner*—Harold D. Anderson
*Attorney, Agent, or Firm*—Stevens, Davis, Miller & Mosher

[57] ABSTRACT

Aromatic polyamides having high polymerization degree are produced by polycondensing an arylene containing aminocarboxylic acid, or a dicarboxylic acid with an aromatic diamine in the presence of a phosphorus compound, a tertiary amine and a metal halide using N-methylpyrrolidone and/or dimethylacetamide as a solvent.

6 Claims, No Drawings

PRODUCTION OF AROMATIC POLYAMIDES FROM DICARBOXYLIC ACID AND DIAMINE

This is a division of application Ser. No. 609,740 filed Sept. 2, 1975 now U.S. Pat. No. 4,045,417.

This invention relates to a process for producing aromatic polyamides. More particularly, this invention relates to a process for producing aromatic polyamides useful as heat-resistant fibers, plastics, etc. by condensing a dicarboxylic acid with an aromatic diamine or polycondensing an arylene containing aminocarboxylic acid using a phosphorus compound, a tertiary amine and a metal halide as additive in the liquid phase.

Polyamides useful as fibers, plastics, etc. have been produced by various processes, but conventional processes have many defects in that it is almost impossible to carry out polycondensation under mild conditions. When an aromatic diamine is used, no nylon salt is produced because of its weak basicity and since polymerization rate is so small and side reactions take place at high temperatures, the polymerization method used for condensing aliphatic diamines and dicarboxylic acids under reduced pressure and high temperature cannot be applied to the condensation of aromatic diamines with dicarboxylic acids. In order to obtain an aromatic polyamide useful as fibers and plastics excellent in heat resistance from an aromatic diamine, low-temperature solution polymerization or interfacial polymerization using a dicarboxylic acid dichloride has been developed. If synthesis of acid chlorides is very difficult, for example in the case of p-aminobenzoic acid, it has been proposed to use an active compound prepared by the reaction with thionyl chloride, for example, p-sulfonyl aminobenzoic acid chloride, as a starting material. But these conventional processes have many defects in that (1) many steps are necessary for preparing the starting materials, (2) there are many disadvantages in purification, purity, storage of the acid chlorides, (3) there arises a problem of corrosion of the apparatus by hydrogen chloride generated by the decomposition during the reaction in the case of using the acid chlorides, and the like. Further, as a direct polymerization method of a dicarboxylic acid and an aromatic diamine, melt polymerization is proposed by Holmer et al. (J. Polymer Sci. A-1, 10, 1547 (1972)), but this method is not suitable for practical production since the use of a thermally stable aromatic diamine is necessary. Ogata et al. propose a process for producing a polyamide using triphenyl phosphite-imidazole system (Polymer J. 2, 672 (1971)), but only a polyamide having very low molecular weight, i.e. $\eta sp/c = 0.1$–$0.3$ in $H_2SO_4$, is obtained by this method.

On the other hand, the present inventors have proposed a process for producing polyamides by condensing a dicarboxylic acid with a diamine or polycondensing an amino acid in the presence of a phosphorous acid ester and a pyridine compound (U.S. patent application Ser. No. 405,906 now U.S. Pat. No. 3,932,364), but this process has a defect in that polyamides having a high polymerization degree are not always obtained in the case of condensation of an aromatic dicarboxylic acid with an arylene containing diamine or direct polycondensation of an aromatic aminocarboxylic acid.

This invention provides an improved process for producing aromatic polyamides overcoming the defects as mentioned above. According to this invention, aromatic polyamides having high polymerization degree can be obtained using N-methylpyrrolidone or dimethylacetamide as a solvent for the liquid phase reaction and adding a metal halide such as lithium halide to the reaction system.

It is an object of this invention to provide a process for producing aromatic polyamides by polycondensing a dicarboxylic acid with an aromatic diamine or polycondensing an arylene containing aminocarboxylic acid under mild conditions. It is a further object of this invention to provide a process for producing aromatic polyamides having high polymerization degree by polycondensing an aromatic dicarboxylic acid with an arylene containing diamine or polycondensing an aromatic aminocarboxylic acid. It is another object of this invention to provide a process for producing aromatic polyamides by using the systems which have been almost impossible to bring about polymerization. It is still another object of this invention to provide a process for producing heat-resistant aromatic polyamides by direct polymerization of an aromatic diamine with a polybasic acid without using an anhydride or other active derivative of polybasic acid. It is yet another object of this invention to provide a process for producing industrially useful aromatic polyamides. Further objects and advantages of this invention will be apparent to one skilled in the art from the accompanying disclosure and discussion.

This invention is characterized by polycondensing directly an arylene containing aminocarboxylic acid or polycondensing directly an aliphatic or aromatic dicarboxylic acid with an aromatic diamine to produce high molecular polyamides.

In accordance with the present invention, aromatic polyamides are produced by polycondensing an arylene containing aminocarboxylic acid of the formula,

wherein $R^1$ is an aromatic hydrocarbon radical which may contain two or more aromatic hydrocarbon radicals bonded through an alkylene group having 1 to 4 carbon atoms, an alkylidene group having 2 to 4 carbon atoms, —O—, —S—, —SO$_2$—, —CO—, —NH—, —NR'— (wherein R' is an alkyl group having 1 to 4 carbon atoms), —CONH—, —SO$_2$NH—,

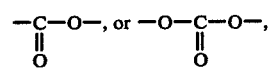

and which may contain one or more substituents on the aromatic nuclei, said substituent being an alkyl group having 1 to 6 carbon atoms, an alkoxy group having 1 to 6 carbon atoms, a phenyl group, a halogen atom, a nitro group or a cyano group, or polycondensing a dicarboxylic acid of the formula,

wherein $R^2$ is a straight chain, branched chain or alicyclic hydrocarbon radical, an aryl group with or without at least one substituent selected from the group consisting of an alkyl group having 1 to 6 carbon atoms, an alkoxy group having 1 to 6 carbon atoms, a phenyl group, a halogen atom, a nitro group and a cyano group; or a radical in which two or more radicals selected from the group consisting of the above-mentioned radicals are bonded through an alkylene group having 1 to 4 carbon atoms, an alkylidene group having 2 to 4 carbon atoms, —CONH— or —SO$_2$NH—, with an aromatic diamine of the formula,

$$H_2N - R^3 - NH_2 \qquad (III)$$

wherein R$^3$ is an aromatic hydrocarbon radical which may contain one or more substituents on the aromatic nuclei, said substituent being an alkyl group having 1 to 6 carbon atoms, an alkoxy group having 1 to 6 carbon atoms, a phenyl group, a halogen atom, a nitro groups, or a cyano group, and which may contain two or more aromatic hydrocarbon radicals bonded through an alkylene group having 1 to 4 carbon atoms, an alkylidene group having 2 to 4 carbon atoms, —O—, —SO$_2$—, —S—, —NH—, —NR″— (wherein R″ is an alkyl group having 1 to 4 carbon atoms), —CONH—, —CO— or —SO$_2$NH—, in the presence of a phosphorus compound of the formula,

$$R^4 - P(OR^5)_2 \qquad (IV)$$

wherein R$^4$ is OR$^5$, a hydroxyl group, an alkyl group having 1 to 6 carbon atoms or an aryl group with or without at least one substituent selected from the group consisting of an alkyl group having 1 to 6 carbon atoms, an alkoxy group having 1 to 6 carbon atoms, a phenyl group, a halogen atom, a nitro group and a cyano group; and R$^5$ is an aryl group with or without at least one substituent selected from the group consisting of an alkyl group having 1 to 6 carbon atoms, an alkoxy group having 1 to 6 carbon atoms, a phenyl group, a halogen atom, a nitro group and a cyano group, a tertiary amine, and a metal halide selected from the group consisting of a lithium halide and a calcium halide, and using N-methylpyrrolidone and/or dimethylacetamide as a solvent.

Namely, the improved process of the present application is characterized by using as a solvent for the liquid phase reaction N-methylpyrrolidone and/or dimethylacetamide and adding either lithium halide or calcium halide to the reaction system.

The phosphorus compound of the formula (IV) used in the present invention includes so-called phosphites or phosphonites, for example, triphenyl phosphite, tri-(o-, m- or p-methylphenyl) phosphite, tri-(o-, m- or p-chlorophenyl) phosphite, diphenyl phosphite, ethyl diphenyl phosphonite [Et - P(OPh)$_2$], n-butyl diphenyl phosphonite [n-Bu-P(OPh)$_2$], phenyl diphenyl phosphonite [Ph - P(OPh)$_2$], and the like. In the above formulae, Et means ethyl, n-Bu means n-butyl and Ph means phenyl. In these compounds, triphenyl phosphite, tri-(o-, m- or p-methylphenyl) phosphite and diphenyl phosphite are more preferable.

Examples of the arylene containing aminocarboxylic acid of the formula (I) used in the present invention are m-aminobenzoic acid, p-aminobenzoic acid, p-(4-aminophenyl)benzoic acid, p-(4-aminobenzyl)benzoic acid, p-aminophenylacetic acid and the like. p-Aminobenzoic acid is more preferable. The aromatic amonocarboxylic acids may be used alone or as a mixture of two or more aminocarboxylic acids.

As the dicarboxylic acid of the formula (II), one having normal or branched alkylene of 3 or more carbon atoms, preferably 3–15 carbon atoms, cycloalkylene of 4 or more carbon atoms, preferably 4–8 carbon atoms or phenylene as R$^2$ is preferable. Examples of these dicarboxylic acids are glutaric acid, adipic acid, pimelic acid, suberic acid, azelaic acid, sebacic acid, brassylic acid, thapsic acid, α-methylglutaric acid, α-methyladipic acid, 1,4-cyclohexane dicarboxylic acid, terephthalic acid, isophthalic acid, and the like.

As the aromatic diamine of the formula (III) used in the present invention, one having phenylene, xylylene, or a radical in which two or more radicals of the above-mentioned aryl groups are bonded through alkylene having 1 to 4 carbon atoms, alkylidene having 2 to 4 carbon atoms, —O—, or —CONH— as R$^3$ is preferable. Examples of these aromatic diamines are p-phenylenediamine, m-xylylenediamine, p-xylylenediamine, bis-(4-aminophenyl)-methane, di-(4-aminophenyl) ether, 2,2-bis-[4-(4-aminophenoxy)phenyl]-propane

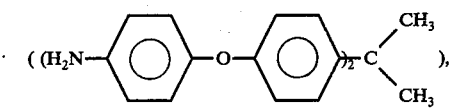

and the like. Among these compounds, p-phenylenediamine, bis-(4-aminophenyl)-methane and bis-(4-aminophenyl) ether are most preferable.

As the tertiary amines, a pyridine derivative such as pyridine, 2-methyl pyridine, 3-methyl pyridine, 4-methyl pyridine, 2,6-dimethyl pyridine and the like are preferable. Pyridine is most preferable. The tertiary amine acts as an acid acceptor and a reaction promoter. When the tertiary amine is liquid, it can be used as a solvent.

As the solvent for carrying out the liquid phase reaction of the present invention, it is essential to use N-methylpyrrolidone and/or dimethylacetamide. The amount of the solvent used is that sufficient for placing a dicarboxylic acid, a diamine, an amino acid, a phosphorus compound, and a tertiary amine used in the present process in a homogeneous liquid phase. Usually, the solvent is preferably used in a condition that the concentration of the starting dicarboxylic acid and aromatic diamine, or the starting aminocarboxylic acid is in a range of from 0.2 to 2.0 moles per liter of the solvent.

In the present process it is essential to add a metal halide selected from the group consisting of lithium halide and calcium halide, for example, lithium chloride, lithium bromide, calcium chloride, calcium bromide, and the like, to the solvent used for the reaction. The metal halide is usually used in 1–15% by weight based on the weight of the mixture of the tertiary amine and N-methylpyrrolidone and/or dimethylacetamide.

Since the polycondensation is carried out in a special solvent including the metal halide in the present invention, aromatic polyamides having high polymerization degree can be obtained in a reaction system such that conventional processes cannot produce polyamides having high polymerization degree.

The polyamidation reaction, i.e. polycondensation, of the present invention can preferably be carried out at a temperature of from 20° to 200° C., more preferably from 70° to 120° C.

The reaction time is not limited but in general a reaction of one hour or more can sufficiently produce the polyamides having high polymerization degree.

In the process of this invention, about equimolar of the dicarboxylic acid of the formula (II) and the aromatic diamine of the formula (III) can preferably be used. One equivalent or more of the phosphorus compound of the formula (IV) can preferably be used per equivalent of the carboxylic group in the dicarboxylic acid or the arylene containing aminocarboxylic acid. Namely 2 moles or more of the phosphorus compound per mole of the dicarboxylic acid or diamine, or one mole or more of the phosphorus compound per mole of the arylene containing aminocarboxylic acid can preferably be used. It is preferable to use one mole or more of the tertiary amine per mole of the phosphorus compound used.

One embodiment of the process of the present invention is as follows. To a mixture of N-methylpyrrolidone or dimethylacetamide (a solvent), a phosphorus compound of the formula (IV), a tertiary amine and a lithium halide or calcium halide, an aromatic aminocarboxylic acid of the formula (I), or a dicarboxylic acid of the formula (II) and an aromatic diamine of the formula (III) are added. The reaction is carried out at the desired reaction temperature to give a homogeneous solution or precipitate of polyamide. When a polyamide is obtained in solution, a non-solvent such as an alcohol is added thereto to deposit the polymer. The precipitate or deposit is collected by filtration and then purified by a conventional method.

The invention is illustrated more particularly by way of the following examples but is not limited to the details thereof.

EXAMPLE 1

A mixture of 2.74 g (0.02 mole) of p-aminobenzoic acid, 2 g of a metal salt as listed in Table 1, 6.21 g (0.02 mole) of triphenyl phosphite, 10 ml of pyridine and 40 ml of N-methylpyrrolidone was heated at 100° C. for 6 hours with stirring under nitrogen atmosphere. After the reaction, the reaction solution was poured into methanol and the deposited polymer was filtered off. After ground, the polymer was washed with methanol, filtered and dried.

The results are as shown in Table 1.

Table 1

| Run No. | Metal salt Name | Concentration (Wt.% in the solvent) | Polymer produced Yield (%) | $\eta_{inh}$* | Remarks |
|---|---|---|---|---|---|
| 1 | LiCl | 4.0 | 100 | 1.27 | Example |
| 2 | CaCl$_2$ | " | 98 | 1.07 | " |
| 3 | Li(AcAc)** | " | 0 | — | Comparative example |
| 4 | CaCl$_2$ . 2H$_2$O | " | 71 | 0.04 | " |
| 5 | KSCN | " | 46 | 0.12 | " |
| 6 | MgCl$_2$ | " | 100 | 0.31 | " |
| 7 | ZnCl$_2$ | " | 97 | 0.20 | " |
| 8 | None | — | 100 | 0.22 | " |

Note)
*$\eta_{inh}$ was measured in a 0.5% solution of concentrated H$_2$SO$_4$ at 30° C.
**Li(AcAc) means lithium acetylacetonate.

EXAMPLE 2

The process of Example 1 Run No. 1 was repeated except for changing the solvent as listed in Table 2.
The results are as shown in Table 2.

Table 2

| Run No. | Solvent Name | Amount (ml/ml) | Polymer produced Yield (%) | $\eta_{inh}$ | Remarks |
|---|---|---|---|---|---|
| 1 | N-Methylpyrrolidone/ pyridine | 20/30 | 100 | 1.21 | Example |
| 2 | " | 30/20 | 100 | 1.52 | " |
| 3 | " | 40/10 | 100 | 1.27 | " |
| 4 | " | 45/5 | 100 | 1.26 | " |
| 5 | Dimethylacetamide/ pyridine | 40/10 | 99 | 0.71 | " |
| 6 | Pyridine | 50 | 100 | 0.21 | Comparative example |
| 7 | Dimethylformamide/ pyridine | 40/10 | 11 | 0.08 | " |

EXAMPLE 3

The process of Example 1, Run No. 1 or 2 was repeated except for changing the concentration of the metal salt (LiCl or CaCl$_2$) as listed in Table 3.
The results are as shown in Table 3.

Table 3

| Run No. | Metal salt Name | Concentration (Wt.% in the solvent) | Polymer produced $\eta_{inh}$ | Remarks |
|---|---|---|---|---|
| 1 | None | — | 0.22 | Comparative example |
| 2 | LiCl | 1.0 | 0.60 | Example |
| 3 | " | 2.0 | 1.20 | " |
| 4 | " | 4.0 | 1.27 | " |
| 5 | " | 8.0 | 1.14 | " |
| 6 | CaCl$_2$ | 2.0 | 0.47 | " |
| 7 | " | 4.0 | 1.07 | " |
| 8 | " | 8.0 | 1.18 | " |
| 9 | " | 12.0 | 1.12 | " |

EXAMPLE 4

The process of Example 1, Run No. 1 was repeated except for changing the reaction temperature and reaction time.
The results are as shown in Table 4.

Table 4

| Run No. | Reaction temperature (° C) | Reaction time (hrs) | $\eta_{inh}$ of the polymer produced |
|---|---|---|---|
| 1 | 80 | 2.0 | 1.03 |
| 2 | " | 3.0 | 1.57 |
| 3 | " | 6.0 | 1.71 |
| 4 | " | 10.0 | 1.52 |
| 5 | 100 | 1.0 | 1.26 |
| 6 | " | 2.0 | 1.35 |
| 7 | " | 6.0 | 1.27 |
| 8 | " | 10.0 | 1.31 |
| 9 | 120 | 2.0 | 1.19 |
| 10 | " | 6.0 | 1.08 |

EXAMPLE 5

The process of Example 1, Run No. 1 was repeated except for changing the concentration of the monomer (p-aminobenzoic acid) as listed in Table 5.
The results obtained are as shown in Table 5.

Table 5

| Run No. | Monomer Name | Concentration (mole/l. solvent) | Polymer produced Yield (%) | $\eta_{inh}$ |
|---|---|---|---|---|
| 1 | p-Aminobenzoic acid | 0.4 | 100 | 1.27 |
| 2 | " | 0.6 | 97 | 1.49 |
| 3 | " | 0.8 | 100 | 1.12 |

EXAMPLE 6

The process of Example 1, Run No. 1 was repeated except for changing the phosphorus compound as listed in Table 6 and the reaction time being 2 hours.
The results are as shown in Table 6.

Table 6

| Run No. | Phosphorus compound Name | Amount (mole) | Polymer produced Yield(%) | $\eta_{inh}$ |
|---|---|---|---|---|
| 1 | $P(O-\phi)_3$ | 0.02 | 98 | 1.35 |
| 2 | $P(O-\phi-CH_3)_3$ (para) | " | 98 | 1.47 |
| 3 | $P(O-\phi-CH_3)_3$ (meta) | " | 95 | 1.34 |
| 4 | $P(O-\phi-CH_3)_3$ | " | 99 | 1.05 |
| 5 | $HO-P(O-\phi)_2$ | 0.03 | 99 | 1.48 |
| 6 | $H_5C_2-P(O-\phi)_2$ | 0.02 | 100 | 0.89 |

EXAMPLE 7

Using 20 ml of N-methylpyrrolidone, 15 ml of pyridine, 1.4 g (4% by weight) of lithium chloride, 2.74 g (0.02 mole) of triphenyl phosphite, 0.01 mole of a diamine as listed in Table 7 and 0.01 mole of a dicarboxylic acid as listed in Table 7 or m-aminobenzoic acid (0.02 mole), polycondensation was carried out at 100° C. for 3 hours.
The results are as shown in Table 7.

Table 7

| Run No. | Dicarboxylic acid | Diamine | Polymer produced Yield (%) | $\eta_{inh}$ |
|---|---|---|---|---|
| 1 | Isophthalic acid | p-Phenylenediamine | 100 | 1.14 |
| 2 | " | Di-(4-aminophenyl) ether | 100 | 0.65 |
| 3 | " | Di-(4-aminophenyl)-methane | 100 | 0.91 |
| 4 | " | m-Aminobenzoic acid | 100 | 0.40 |

What is claimed is:

1. In a process for producing a fiber forming aromatic polyamide by polycondensing a dicarboxylic acid of the formula, $$HOOC - R^2 - COOH \quad (II)$$

wherein $R^2$ is a straight chain, branched chain or alicylic hydrocarbon radical, an aryl group with or without at least one substituent selected from the group consisting of an alkyl group having 1 to 6 carbon atoms, an alkoxy group having 1 to 6 carbon atoms, a phenyl group, a halogen atom, a nitro group and a cyano group, or a radical in which two or more radicals selected from the group consisting of the above-mentioned radicals are bonded through an alkylene group having 1 to 4 carbon atoms, an alkylidene group having 2 to 4 carbon atoms, —CONH— or —SO₂NH—, with an aromatic diamine of the formula, $$H_2N - R^3 - NH_2 \quad (III)$$

wherein $R^3$ is an aromatic hydrocarbon radical which may contain one or more substituents on the aromatic nuclei, said substituent being an alkyl group having 1 to 6 carbon atoms, an alkoxy group having 1 to 6 carbon atoms, a phenyl group, a halogen atom, a nitro group or a cyano group, and which may contain two or more aromatic hydrocarbon radicals bonded through an alkylene group having 1 to 4 carbon atoms, an alkylidene group having 2 to 4 carbon atoms, —O—, —SO₂—, —S—, —NH—, —NR″— wherein R″ is an alkyl group having 1 to 4 carbon atoms, —CONH—, —CO— or —SO₂NH—, in the presence of a phosphorus compound of the formula, $$R^4 - P(OR^5)_2 \quad (IV)$$

wherein $R^4$ is $OR^5$, a hydroxyl group, an alkyl group having 1 to 6 carbon atoms or an aryl group with or without at least one substituent selected from the group consisting of an alkyl group having 1 to 6 carbon atoms, an alkoxy group having 1 to 6 carbon atoms, a phenyl group, a halogen atom, a nitro group and a cyano group; and $R^5$ is an aryl group with or without at least one substituent selected from the group consisting of an alkyl group having 1 to 6 carbon atoms, an alkoxy group having 1 to 6 carbon atoms, a phenyl group, a halogen atom, a nitro group and a cyano group, and a teriary amine in the liquid phase, wherein the tertiary amine is used in an amount of 1 mole or more per mole of the phosphorus compound and the phosphorus compound is used in an amount of 2 moles or more per mole of the dicarboxylic acid or diamine, the improvement which comprises carrying out the polycondensation using a solvent selected from the group consisting of N-methylpyrrolidone and dimethylacetamide as the reaction medium and a metal halide selected from the group consisting of a lithium halide and a calcium halide wherein the metal halide is used in an amount of 1 to 15% by weight based on the weight of the mixture of the tertiary amine and the solvent.

2. A process according to claim 1, wherein the dicarboxylic acid is glutaric acid, adipic acid, pimelic acid, suberic acid, azelaic acid, sebacic acid, brassylic acid, thapsic acid, α-methylglutaric acid, α-methyladipic acid, 1,4-cyclohexanedicarboxylic acid, terephthalic acid or isophthalic acid.

3. A process according to claim 1, wherein the aromatic diamine is p-phenylenediamine, m-xylylenediamine, p-xylylenediamine, bis-(4-aminophenyl)-methane, di-(4-aminophenyl) ether or 2,2-bis-[4-(4-aminophenoxy)phenyl]-propane.

4. A process according to claim 1, wherein the aromatic diamine is p-phenylenediamine, bis-(4-aminophenyl)-methane or bis-(4-aminophenyl) ether.

5. A process according to claim 1, wherein the solvent is used in a condition that a concentration of the starting dicarboxylic acid and aromatic diamine, is in a range of from 0.2 to 2.0 moles per liter of the solvent.

6. A process according to claim 1, wherein the metal halide is used in 1-15% by weight based on the weight of a mixture of the tertiary amine and the solvent.

* * * * *